June 30, 1942. H. E. SOMES 2,288,034
ELECTRIC TRANSMISSION SYSTEM
Filed July 25, 1939
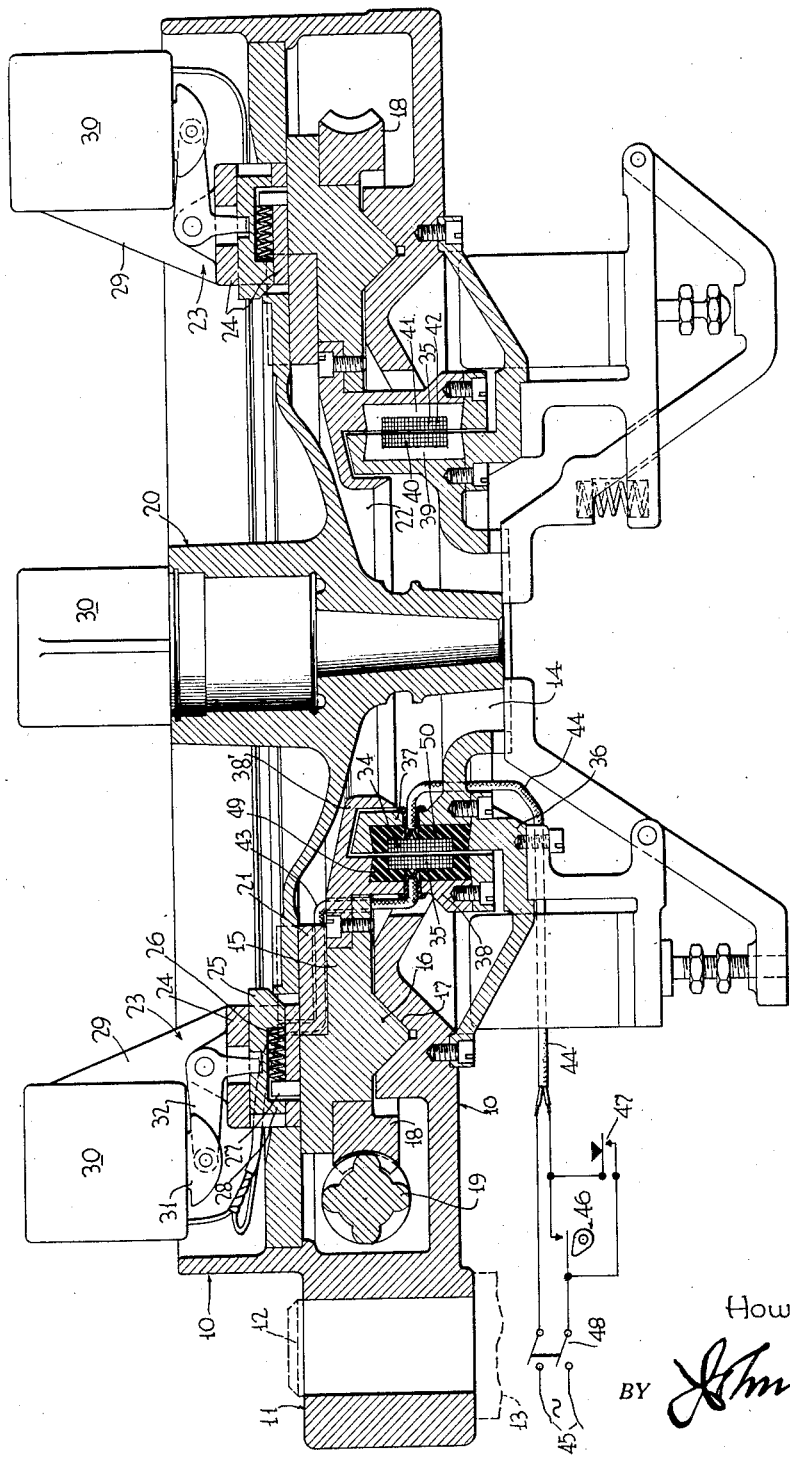
INVENTOR
Howard E. Somes
BY *J. Mr. P. Tarbox*
ATTORNEY Patented June 30, 1942

2,288,034

UNITED STATES PATENT OFFICE 2,288,034

ELECTRIC TRANSMISSION SYSTEM

Howard E. Somes, Grosse Pointe Park, Mich., assignor to Budd Induction Heating, Inc., Philadelphia, Pa., a corporation of Michigan Application July 25, 1939, Serial No. 286,345

8 Claims. (Cl. 266—6)

The present invention relates in general to transmission of electrical control between relatively movable elements, and particularly between elements relatively movable about a common axis.

An object of the invention is to effect transmission of electrical control from one to the other of machine elements relatively rotatable about a common axis, and with avoidance of slip ring connections or other exposed, electrical contact devices.

Another object of the invention is to provide for the transmission of electrical control between relatively rotatable elements without the use of parts subject to wear or requiring servicing to correct for wear, oxidation and the like, and thereby capable of being located in places confined and not readily accessible.

The present invention finds special utility in the transmission of electrical control between such relatively movable parts as the carriage and work holder elements of the automatic heat treating machine disclosed in my copending application Serial No. 164,320, filed September 17, 1937, the embodiment of the invention here shown, for the sake of disclosure, being one adapted for application to such machine.

Various objects of the invention will become apparent upon a perusal of the following specification and the drawing accompanying same.

The accompanying drawing is a vertical, axial section showing the relatively rotatable support and the work holder of the machine disclosed in my aforesaid application, with the present invention applied thereto.

Referring to the drawing in detail, this shows the invention applied to a rotary work holder for holding a work piece to be heat-treated and quenched, which holder may form part of any machine in which such a holder is desirable the holder here shown being that of the automatic heat treating machine disclosed in the aforesaid co-pending application.

The part of the machine here shown comprises a stationary support 10 of general annular form arranged to be mounted in the machine in which it is to be used by means of suitable socket lugs one of which is shown at 11 and of which there may be several, spaced about the annular form support 10, the lugs being arranged to fit over suitable dowels such as 12 at the top of supporting posts 13 forming part of the main machine not shown. The support 10 is provided with a central drainage opening 14 above which is rotatably mounted the work holder 15 also of general annular form and rotatably mounted upon the support element 10 by means of a V-shaped bearing ring 16 formed on the bottom of the holder and bearing in an annular V-shaped trough 17 formed in the holder 10. The holder 15 is arranged to be rotated by means of a worm-gear ring 18 mounted on the holder and driven by a driving worm 19 operated by suitable motor means not shown. The work holder 15 is arranged to receive a work piece 20 here shown in the form of an automobile wheel-hub which is seated in a ring shaped adapter element 21 secured centrally in the rotatable work holder 15. A drainage opening 22 is provided also in the work holder above and in register with the drainage opening 14 in the stationary support.

The portions of the support and rotary work holder so far described above are the same as those shown and described in the aforesaid co-pending application. In the present invention the rotatable work holder 15 is provided with two or more electrically operated latches 23 spaced around the holder for latching the work piece 20 in position in the holder as shown. Inasmuch as the latch elements 23 are identical in structure a detailed description of one will suffice. Each latch element comprises a latch housing 24 secured to the work holder 15 and arranged to house a sliding latch-bolt 25 normally spring pressed against the edge of the workpiece by means of a compression spring 26 having one end bearing against an inner portion of the forward end of the latch-bolt and the other end against an abutment pin 27, which pin also acts as a stop for engaging the rear end portion 28 of the latch-bolt to limit the forward movement of the bolt in the unloaded condition of the work holder. Mounted on the housing 24 by means of a bracket 29 is an electrically operated motor means in the form of an electromagnetic solenoid 30, having a plunger element 31 operating upon a bell crank lever 32, the lower end 33 of which lever engages the latch-bolt 25 for moving the same radially outwardly of the holder and away from the workpiece upon upward movement of the plunger 31 when the solenoid is energized.

The motor means 30 is arranged to be energized through a pair of inductively coupled primary and secondary transformer elements 34 and 35 respectively mounted concentrically of the axis of rotation and in transformer relation with each other. The primary element 34 is mounted in a radially inner portion 36 of the stationary support near the central drain opening but separated from the drain opening by an annular separating wall element 37 extending upwardly along the drain opening, while the secondary element 35 is mounted in a cylindrical downward extension 38 of the rotatable holder encircling the primary element. An annular radially inward and downward flange extension 38' of the holder forms the inner wall portion of the central opening in the holder and extends downwardly into the drain opening 14 of the stationary support. The extension 38' thus forms a sheltering flange over the transformer elements and over and around the top of the separating wall 37.

The primary transformer element 34 consists of a shell-core portion 39 of annular outwardly-facing channel section built up of laminations, the channel shaped core portion containing the primary winding 40. Similarly the secondary transformer element consists of a shell-core portion 41 of a shape similar and complementary to that of the core-portion 39, also built up of laminations and containing the secondary winding 42. A suitable feed cable 43 supplies current to the latch operating solenoids 30 from the secondary winding 42, and current is supplied to the primary winding 40 through cable 44 from a suitable source of current such as the supply lines 45, preferably a source of alternating current, or other form of energy capable of distribution through a transformer such as pulsating or interrupted current. Control of the energization of the transformer may be effected by a suitable timed control switch 46 or push button 47, preferably jointly, as indicated by the parallel connection of such controls so that energization of the transformer may be controlled in suitable timed relation with other operations of a machine in which the device may be incorporated, or at will. It is also to be understood that in addition to the usual main line switch such as 48, other usual accessories such as fuses, safety devices, etc. may be used in the supply circuit. Where the conductor cables 43 and 44 pass through the laminated transformer core elements to the transformer windings the core sections are provided with insulating blocks 49 and 50 respectively, each having a cross sectional contour like that of the laminations of its respective core element. It is to be understood that such blocks are of just sufficient circumferential extent to permit their having an aperture sufficiently large to admit the cable with adequate thickness of insulation on each side.

In the structure above described the parts are so proportioned and arranged in relation to each other, that the primary and secondary transformer elements 34 and 35 are in spaced inductive relation and concentric with the axis of rotation of the rotary work holder 15, so as to maintain such relation in any of the possible various relative angular positions of the support 10 and holder 15.

With the transformer elements thus positioned radially outwardly of the protecting wall 37, and beneath the sheltering flange 38', the transformer assemblage is protected from water or other quenching fluid, copious quantities of which must be disposed of through the large drain openings 22 and 14 in the center of the rotary work holder and support. A large portion of the quenching liquid flows downwardly over the sheltering flange 38' as overflow from the top of the hub due to the liquid being supplied in a quantity faster than can be disposed of through the bottom opening in the hub. There is also considerable liquid trapped around the top of the hub flange which naturally spills down over the sheltering flange 38' to the drain openings upon unloading of the work holder. The sheltered position of the transformer elements also protects them from other injurious influences such as oil and debris from the material worked upon. This encasement of the distributing transformer in assembled position is of no objection inasmuch as there are no wearing parts to be replaced such as would be the case in the use of slip rings and brushes. Also as there is no necessity for contacting of surfaces between the moving parts of the distributing transformer assemblage the exposed portions of the laminations and windings may be well protected from atmospheric moisture by coating in the usual manner with suitable waterproof insulating compounds.

During operation upon the workpiece, the latch-bolt remains in latching engagement with the workpiece under the force of the compression spring 26. Upon completion of the operation upon the workpiece the timed control switch 46 is closed, completing an energizing circuit for the primary transformer element which may be traced from the supply line 45 through the switch contacts 46 and cable 44 to the winding 40 of the primary transformer element 34. This induces current in the winding 42 of the secondary element 35 which current is transmitted over cable 43 to the solenoids 30. Energization of solenoids 30 causes retraction of their plunger elements 31 swinging the bell-crank levers 32 to move their lower ends 33 radially outwardly, in turn effecting a radially outward sliding movement of the latch bolts 25 against the tension of their compression springs 26 to release the workpiece 20. Upon opening of the contacts 46, which of course is timed to permit removal of the workpiece, the solenoids 30 become de-energized releasing their plunger elements to permit the latch bolts to return to the normal position shown.

While I have herein shown and described a specific embodiment of my invention for the sake of disclosure, it is to be understood that the invention is not limited to such specific embodiment but contemplates all such modifications and variants thereof as fall fairly within the scope of the appended claims.

What I claim is:

1. In combination, a stationary support, a work holder rotatably mounted on said support, an electrically actuated work engaging latch element carried by the work holder for securing a workpiece in place in said work holder, yieldable means cooperating with said stationary support and with said latch element for moving the latch element in a direction to cooperate with the work, a secondary transformer element in the form of an annulus mounted on the work holder concentric with the axis of rotation of the latter and electrically connected with a latch actuating element for energizing the same, a primary transformer element in the form of an annulus mounted on the stationary support concentric with said axis of rotation and out of contact with but in inductive relation with said secondary transformer element, and means fixed in relation to said stationary support for effecting connection of said primary element with a source of electric energy supply.

2. In combination, a stationary support having a central drainage opening, a substantially coaxial work holder having a work engaging latch element and rotatably mounted upon said support radially outside said opening and having a drainage opening above said first mentioned drainage opening, a primary transformer element in the form of an annulus mounted on the stationary support concentric with the axis of rotation of said holder, an annular wall element on said support separating said primary transformer element from the drainage opening in the support and having said primary element received in a recess therein, a secondary transformer element in the form of an annulus beneath said work holder in encircling inductive relation to said primary transformer element and connected with the latch element for actuating the same, and means for connecting said primary element with a source of electrical energy supply.

3. In combination, a stationary support having a central drainage opening, a work holder having a work engaging latch element and rotatably mounted upon said support and having a drainage opening above said first mentioned drainage opening, a primary transformer element in the form of an annulus mounted on the stationary support concentric with the axis of rotation of said holder, an annular wall element on said support separating said primary transformer element from the drainage opening in the support and concentric with said axis of rotation, an annular sheltering flange carried by the work holder extending radially inwardly and downwardly over the said annular separating wall element, a secondary transformer element in the form of an annulus mounted on the work holder under said fluid sheltering flange concentric with said axis of rotation in inductive relation with said primary element and electrically connected with the latch element for energizing the same, and means fixed in relation to said stationary support for effecting connection of said primary element with a source of electrical energy supply.

4. In combination a rotary holder for a work piece, having a work engaging latch and adapted to receive a quenching liquid, and having a drain opening therethrough concentric with the axis of rotation, a stationary support for the holder having a drain opening below the opening in the holder and substantially concentric therewith, electrically actuated means for operating said latch and an energizing transformer secondary-element connected to the electrically actuated means both said electrically actuated means and said secondary element carried by the holder, a transformer primary element mounted on said stationary support, said transformer elements being of annular form and including complemental annular core parts and annular coils arranged in inductive relation and concentric with the axis of rotation of said holder said core parts having axially spaced pole pieces each closely adjacent a pole piece on the other element so as to remain in inductive relation in all angular positions of rotation of the holder with reference to the support, and a sheltering flange extending from an inner portion of said holder radially inwardly and downwardly around said transformer elements to form the drain opening in the holder.

5. Means for transmitting electrical energy between relatively rotatable parts for actuating electrical responsive means fixed with relation to one part from a point of control fixed in relation to the other part, which comprises a pair of separate concentric annular transformer elements mounted one on each part coaxially with the axis of relative rotation and in inductive relation with each other, said elements including annular coils and core sections, the core sections being composed of laminations and supporting means therefor shielded by the laminations from the coils, and said laminations being of trapezoidal shape and being dovetailed in said supporting means, the stationary element being radially inward of the rotatable element, and having a central aperture therethrough, and protecting means carried by the rotatable element overhanging and extending radially inwardly over said stationary element.

6. Means for transmitting electrical energy between relatively rotatable parts for actuating electrical responsive means fixed with relation to one part from a point of control fixed in relation to the other part, which comprises a pair of separate concentric annular transformer elements mounted one on each part coaxially with the axis of relative rotation and in inductive relation with each other, said elements including annular coils and core sections, the core sections being composed of laminations and supporting means therefor shielded by the laminations from the coils, and said laminations being of trapezoidal shape and being dove-tailed in said supporting means, the stationary element being radially inward of the rotatable element, and having a central aperture therethrough, protecting means carried by the rotatable element overhanging and extending radially inwardly over said stationary element and a bearing between one part and the other part located radially outward from said elements.

7. Means for transmitting electrical energy between relatively rotatable parts for actuating electrical responsive means fixed with relation to one part from a point of control fixed in relation to the other part, which comprises a pair of separate concentric annular transformer elements mounted one on each part coaxially with the axis of relative rotation and in inductive relation with each other, said elements including annular coils and core sections, the core sections being composed of laminations, electrical responsive means carried by one of said parts connected in circuit with the transformer element carried by that part, and means fixed in relation to the other part for connecting the transformer element mounted on that latter part with a source of electrical energy, a bearing between said elements located outside said transformer elements.

8. An apparatus in which a workpiece may be rotated while being heated and quenched, said apparatus including a stationary support, a rotatable work holder, a latch for holding a workpiece in place on said holder, yieldable means cooperating with said latch and holder for pressing said latch into cooperation with said workpiece, electrically actuated means for retracting said latch against the action of said yieldable means, a transformer for supplying current to said electrically actuated means, the secondary of said transformer being carried by said holder beneath the workpiece and adjacent a radially inner edge thereof, the primary of said transformer being stationary, both the primary and secondary being circumferentially continuous and having cores of opposed channel-shaped laminations with a transformer winding in each channel and the poles of each core closely adjacent one of another, said rotatable holder having a projecting portion which extends over a space between the primary and secondary and radially over the primary to protect the same from quenching fluid passing through said workpiece and a radially inward projection extending from said support on the side thereof opposite said holder to the radially inner side of said secondary for supporting said primary, the radially inner part of said projection being shaped to direct quenching fluid away from said transformer by gravity.

HOWARD E. SOMES.